United States Patent [19]

Varlamov et al.

[11] 4,226,968

[45] Oct. 7, 1980

[54] METHOD OF PRODUCING FURAN-EPOXY POWDER-LIKE BINDER

[76] Inventors: Gennady D. Varlamov, ulitsa Jubileinaya, 5, kv. 13; Ildgam A. Bekbulatov, ulitsa Kashkarskaya, 215; Shavkat Madaliev, ulitsa Yarmazar, 361; Juldash Mamatov, ulitsa Pushkina, 50, kv. 60; Alexandra V. Proshkina, ulitsa 25-letia Oktyabrya, 56, kv. 6; Svetlana N. Ubiennykh, ulitsa 50-letia VLKSM, 14, kv. 14, all of Fergana, U.S.S.R.

[21] Appl. No.: 913,085

[22] Filed: Jun. 6, 1978

[51] Int. Cl.$^2$ ............................................. C08G 59/40
[52] U.S. Cl. ........................................ 528/91; 528/94; 528/111; 528/116; 528/117; 528/118
[58] Field of Search ............... 528/111, 116, 117, 118, 528/91, 94, 229

[56] References Cited

U.S. PATENT DOCUMENTS

3,433,807  3/1969  Jones et al. ........................ 260/347.7

OTHER PUBLICATIONS

Mamatov et al., "A Study of Thermal Curing of Difurfurylidene Acetone", from publication entitled, "Production & Processing of Plastic Materials", Research Institute for Plastic Materials, No. 3, Moscow, 1972.

Varlamov et al., Inventor's Certificate No. 533,618, Abstract in Bulletin of Inventions, U.S.S.R., 1976, No. 40, p. 67.

Lisitsyn et al., "Flooring Compositions Resistant to Attack", by Corrosive Substances, "Chem. Abstracts 67, 12599y (1967).

Varlamov et al., "Hardening of Epoxy Resins", Chemical Abstracts 76, 128093u, (1972).

*Primary Examiner*—Earl A. Nielsen
*Attorney, Agent, or Firm*—Fleit & Jacobson

[57] ABSTRACT

A method of producing furan-epoxy powder-like binder comprising reacting the product of the polycondensation of epichlorohydrin with diphenylpropane (100 weight parts) with a ketone containing a furfurylidene group (33–200 weight parts) and a nitrogen-containing compound (8–100 weight parts). As examples of the ketone containing a furfurylidene group monofurfurylideneacetone, difurfurylideneacetone, difurfurylidenecyclohexanone, a mixture of monofurfurylideneacetone with difurfurylideneacetone in a ratio (weight parts from 1:1 to 1.4:1; 1,9-di-(α-furyl)-nonanetetracene-1,3,6,8-one-5 or 1,5 -di-(α-furyl)-2,4-dimethylpentadiene-1, 4-one-3 may be mentioned. Triethanolamine, 3-methyl-5-furylpyrazoline, trifurylimidazoline, hexamethylenediamine, and low molecular polyamides with molecular weight of 2000–10000 or polyethylenepolyamine with molecular weight of 1000 are used as a nitrogen-containing compound. The reaction is performed at 130°–200° C. in the presence, if necessary, of trifurfurylborate (1–12 weight parts). The obtained product is cooled down to a temperature not exceeding 30° C. and ground to a powder state. The furan-epoxy binder does not cake for 60 days and retains its properties upon storing for a long period of time (up to 12 months). Heat distortion temperature of polymer materials based on the above-cited binder is 250° C. according to the Vicat method. Polymer materials formed from said binder can be combustible and incombustible or display ability to self-extinction.

37 Claims, No Drawings

METHOD OF PRODUCING FURAN-EPOXY POWDER-LIKE BINDER

FIELD OF APPLICATION OF THE INVENTION

The present invention relates to producing furan-epoxy powder-like binder used in manufacturing moulding materials, adhesives, polymer coatings, foam plastics, laminated plastics, and the like.

BACKGROUND OF THE INVENTION

Known in the art is a method of producing furan-epoxy powder-like binder by reacting the product of the polycondensation of epichlorohydrin with bis(hydroxyphenyl)propane (hereinafter polycondensation resin) with difurfurylideneacetone and a nitrogen-containing compound, namely, furfuramide at 140° C. and at the following ratio between the components (weight parts):

polycondensation: 100
difurfurylidenacetone: 50–150
furfuramide: 95–100;

the obtained product is cooled down to a temperature not exceeding than 30° C. and ground to a powder state.

A binder obtained by the known method has a high tendency to caking (is caked after 30 days) and loses its initial properties, solubility and fusibility, upon short-time storage (not more than 3 months). Heat distortion temperature of the polymer materials based on known furan-epoxy binder does not exceed 208° C. according to the Vicat Method. Besides, polymer materials based on the known binder are combustible.

BRIEF DESCRIPTION OF THE INVENTION

It is an object of the invention to provide a method of producing furan-epoxy powder-like binder which will ensure the production of a binder with enhanced non-caking.

Another object of the invention is to provide a method of producing furan-epoxy powder-like binder which will ensure the production of a binder retaining its initial properties upon prolonged storage.

It is also an object of the invention to increase heat distortion temperature of polymer materials based on the furan-epoxy binder.

A still further object of the invention is to impart to polymer materials, based on the furan-epoxy powderous binder, incombustibility or tendency to self-extinction.

In accordance with these and other objects the invention resides in a method of producing furan-epoxy powder-like binder by interacting the reaction product of the polycondensation of epichlorohydrin with diphenylpropane with a furan-carrying ketone and a nitrogen-containing compound upon heating with subsequent cooling of the obtained product down to a temperature not exceeding 30° C. and grinding to a powder state. According to the invention, a furfurylidene-containing ketone can be made from monofurfurylideneacetone, difurfurylideneacetone, difurfurylidenecyclohexanone, a mixture of monofurfurylideneacetone, with difurfurylideneacetone at a ratio (weight parts) of from 1:1 to 1.4:1, 1,9-di-(α-furyl)-nonantetraene-1,3,6,8-one-5or 1,5-di (-α-furyl)-2,4-dimethylpentadiene-1,4-one-3. As the nitrogen-containing compound, triethanolamine, 3-methyl-5-furylpyrazoline, trifurylimidazoline, hexamethylenediamine, low molecular polyamides with molecular weight of 2,000–10,000 or polyethylenepolyamine with molecular weight of 1000 may be used, the reaction being performed at 130°–200° C. and in the following ratio of said components (weight parts):

Polycondensation: 100
furfurylidene-containing ketone: 33–200
nitrogen-containing compound: 8–100.

The proposed method ensures the production of a furan-epoxy binder which does not cake for 60 days and can be stored for a long time (up to 12 months) without a change in the initial properties. Heat distortion temperature of polymer materials based on said binder is 250° C. according to Vicat Method.

It is recommended to perform the reaction of the above-cited components in the presence of trifurfurylborate at a ratio of trifurfurylborate and polycondensation resin (in weight parts) equal to 1–12:100 respectively. As a result, a furan-epoxy binder is obtained which imparts incombustibility and tendency to self-extinguish to polymer materials based on said binder. The proposed method is technologically simple and does not require complicated equipment. The method ensures a high yield (up to 95%) of the end product.

DETAILED DESCRIPTION OF THE INVENTION

The polycondensation resin, the furfuryl-containing ketone, a nitrogen-containing compound, and, if necessary, trifurfuryl borate, are placed in a required ratio into a reactor fitted with a heating device, a reflux condenser, a thermometer, and a stirrer. The reaction mixture is heated up to 130°–200° C. and the process is run at this temperature for 1–3 hours. The obtained furan-epoxy binder is poured out from the reactor on a tray, cooled to a temperature not exceeding 30° C., for example, to room temperature, and ground to a powder with the required particle size (depending on the field of application of the binder). It is not expedient to cool the binder to a temperature above 30° C., since in this case the binder being ground may adhere to the component parts of the grinding device.

Low molecular weight polyamides with molecular weight of 2000–10000 used in the proposed method are obtained by the known method comprising polycondensation of dimerized fatty acids (for instance, dimerized linseed oil, dimerized oleic, linoleic, or linolenic acid) with polyethylenepolyamine having molecular weight of 1000 (see, for example Encyclopaedia of Polymers, Moscow, 1974, vol. 2, pp. 736–746).

Polyethylenepolyamine with the above-cited molecular weight also used in the proposed invention is obtained by the known method comprising polycondensation of dichloroethane with ammonia (see, for example, Encyclopaedia of Polymers, Moscow, 1974, vol. 2, pp. 747–749).

A mixture of monofurfurylideneacetone with difurfurylideneacetone used in the proposed method can be obtained by condensation of furfurol with acetone in the presence of a catalyst (an alkali) at 60°–90° C. (see, for example, Orobchenko E.V. "Furan Resins", Kiev, 1963, pp. 64–70).

For a better understanding of the present invention specific examples of realizing thereof are given hereinbelow by way of illustration. The properties of the furan-epoxy powder-like binder and a polymer based thereon are given in Tables 1 and 2, respectively, after the Examples.

EXAMPLE 1

200 g of polycondensation resin with the number of epoxy groups 14–16% on a weight basis, 100 g of difurfurylideneacetone, 10 g of trifurylborate and 200 g of trifurylimidazoline are put into a reactor fitted with a heating device, a reflux condenser, a thermometer, and a stirrer. The ratio of the above-cited components is 100:50:5:100, respectively. The temperature in the reactor is raised up to 140° C. and the process is run at this temperature for 1.5 hours. The obtained furan-epoxy binder (yield 92%) is poured out from the reactor, cooled to 30° C. and ground to a powder state.

EXAMPLE 2

200 g of polycondensation resin with the number of epoxy groups 20–22% by weight, 66 g of difurfurylideneacetone, 14 g of trifurylborate, and 200 g of trifurylimidazoline are put into the reactor similar to that described in Example 1. The ratio of the abovecited components (in weight parts) is 100:33:7:100, respectively. The process is run at 130° C. for 2 hours. The obtained product (yield 95%) is poured from the reactor, cooled to 25° C., and ground to a powder state.

EXAMPLE 3

200 g of polycondensation resin with the number of epoxy groups 16–18% by weight, 260 g of difurfurylideneacetone, 24 g of trifurfurylborate, and 200 g of trifurylimidazoline are put into a reactor similar to that described in Example 1. The ratio of the above-cited components is 100:130:12:100, respectively. The process is run at 140° C. for 2.5 hours. The obtained product (yield 92%) is poured out from the reactor, cooled to 20° C. and ground to a powder state.

EXAMPLE 4

200 g of polycondensation resin with the number of epoxy groups 18–20% by weight, 200 g of a mixture of monofurfurylideneacetone with difurfurylideneacetone in a ratio (weight parts) of 1:1, 2 g of trifurfurylborate, and 200 g of trifurylimidazoline are put into a reactor similar to that described in Example 1. The ratio of the above-cited components in weight parts is 100:100:1:100, respectively. The process is run at 145° C. for 1.5 hours. The obtained product (yield 88%) is poured out from the reactor, cooled to 15° C. and ground to a powder state.

EXAMPLE 5

200 g of polycondensation resin with the number of epoxy groups 22–24% by weight, 300 g of a mixture of monofurfurylideneacetone with difurfurylideneacetone in a ratio of 1.2:1 (in weight parts), 14 g of trifurfurylborate, and 200 g of trifurylimidazoline are put into a reactor similar to that described in Example 1. The ratio of the above-cited components is 100:150:7:100, respectively. The process is run at 140° C. for 1.5 hours. The obtained product (yield 91%) is poured out from the reactor, cooled to 20° C. and ground to a powder state.

EXAMPLE 6

200 g of polycondensation resin with the number of epoxy groups 16–18% by weight, 66 g of a mixture of monofurfurylideneacetone with difurfurylideneacetone at a ratio of 1.4:1 (in weight parts), respectively, 24 g of trifurfurylborate, and 100 g of trifurylimidazoline are put into a reactor similar to that described in Example 1. The ratio of the above-cited components is 100:33:12:50, respectively. The process is run at 140° C. for 1.5 hours. The obtained product (yield 88%) is poured out form the reactor, cooled to 25° C. and ground to a powder state.

EXAMPLE 7

200 g of polycondensation resin with the number of epoxy groups 18–20% by weight, 200 g of 1,5-di-($\alpha$-furyl)-2,4-dimethylpentadiene-1,4-one-3, 2 g of trifurfurylborate, and 200 g of trifurylimidazoline are put into a reactor similar to that described in Example 1. The ratio of the above-cited components is 100:100:1:100, respectively. The process is run at 140° C. for 1.5 hours. The obtained product (yield 92%) is poured out from the reactor, cooled to 30° C., and ground to a powder state.

EXAMPLE 8

200 g of polycondensation resin with the number of epoxy groups 20–22% by weight, 200 g of 1,9-di-($\alpha$-furyl)-nonanetetraene-1,3,6,8-one-5, 20 g of trifurfurylborate, and 200 g of trifurylimidazoline are put into a reactor similar to that described in Example 1. The ratio of the components in weight parts is 100:100:10:100, respectively. The process is run at 130° C. for 2 hours. The obtained product (yield 95%) is poured out from the reactor, cooled to 20° C., and ground to a powder state.

EXAMPLE 9

200 g of polycondensation resin with the number of epoxy groups 14–16% by weight, 66 g of difurfurylideneacetone, 3.4 g of trifurfurylborate, and 80 g of 3-methyl-5-furylpyrazoline are put into a reactor similar to that described in Example 1. The ratio of the components in weight parts is 100:33:1.7:40, respectively. The process is run at 140° C. for 2 hours. The obtained product (yield 90%) is poured out from the reactor, cooled to 15° C. and ground to a powder state.

EXAMPLE 10

200 g of polycondensation resin with the number of epoxy groups 16–18% by weight, 200 g of difurfurylideneacetone, 18 g of trifurfurylborate, and 200 g of 3-methyl-5-furylpyrazoline are put into a reactor similar to that described in Example 1. The ratio of the components in weight parts is 100:100:9:100, respectively. The process is run at 160° C. for 1 hour. The obtained product (yield 93%) is poured out from the reactor, cooled to 25° C. and ground to a powder state.

EXAMPLE 11

200 g of polycondensation resin with the number of epoxy groups 20–22% by weight, 300 g of difurfurylideneacetone, 24 g of trifurfurylborate, and 180 g of 3-methyl-5-furylpyrazoline are put into a reactor similar to that described in Example 1. The ratio of the components in weight parts is 100:150:12:90, respectively. The process is run at 180° C. for 1.5 hours. The obtained product (yield 92%) is poured out from the reactor, cooled to 30° C., and ground to a powder state.

EXAMPLE 12

200 g of polycondensation resin with the number of epoxy groups 18–20% by weight, 200 g of a mixture of monofurfurylideneacetone with difurfurylidene acetone in a ratio of 1.4:1 weight parts, respectively, 24 g of trifurfurylborate, and 200 g of 3-methyl-5-furylpyrazoline are put into a reactor similar to that described in Example 1. The ratio of the components in weight parts is 100:100:12:100, respectively. The process is run at 150° C. for 1.5 hours. The obtained product (yield 88%) is poured out from the reactor, cooled to 15° C., and ground to a powder state.

EXAMPLE 13

200 g of polycondensation resin with the number of epoxy groups 18-20% by weight, 200 g of monofurfurylideneacetone, 24 g of trifurfurylborate, and 200 g of 3-methyl-5-furyl-pyrazoline are put into a reactor similar to that described in Example 1. The ratio of the components in weight parts is 100:100:12:100, respectively. The process is run at 150° C. for 1.5 hours. The obtained product (yield 90%) is poured out from the reactor, cooled to 20° C., and ground to a powder state.

EXAMPLE 14

200 g of polycondensation resin with the number of epoxy groups 22-24% by weight, 200 g of difurfurylideneacetone, 24 g of trifurfurylborate, and 200 g of 3-methyl-5-furylpyrazoline are put into a reactor similar to that described in Example 1. The ratio of the components in weight parts is 100:100:12:100, respectively. The process is run at 150° C. for 1.5 hours. The obtained product (yield 94%) is poured out from the reactor, cooled to 25° C., and ground to a powder state.

EXAMPLE 15

200 g of polycondensation resin with the number of epoxy groups 22-24% by weight, 200 g of difurfurylidenecyclohexanone, 20 g of trifurfurylborate, and 100 g of 3-methyl-5-furylpyrazoline are put into a reactor similar to that described in Example 1. The ratio of the components in weight parts is 100:100:10:50, respectively. The process is run at 180° C. for 2 hours. The obtained product (yield 92%) is poured out from the reactor, cooled to 30° C., and ground to a powder state.

EXAMPLE 16

200 g of polycondensation resin with the number of epoxy groups 22-24% by weight, 200 g of 1,9-di-(α-furyl)-nonanetetraene-1,3,6,8-one-5, 24 g of trifurfurylborate, and 200 g of 3-methyl-5-furylpyrazoline are put into a reactor similar to that described in Example 1. The ratio of the components in weight parts is 100:100:12:100. The process is run at 150° C. for 1.5 hours. The obtained product (yield 90%) is poured out from the reactor, cooled to 25° C., and ground to a powder state.

EXAMPLE 17

200 g of polycondensation resin with the number of epoxy groups 22-24% by weight, 400 g of difurfurylideneacetone, and 16 g of 3-methyl-5-furylpyrazoline are put into a reactor similar to that described in Example 1. The ratio of the components in weight parts is 100:200:8, respectively. The process is run at 200° C. for 1 hour. The obtained product (yield 88%) is poured out from the reactor, cooled to 25° C., and ground to a powder state.

EXAMPLE 18

200 g of polycondensation resin with the number of epoxy groups 18-20% by weight, 66 g of difurfurylidenecyclohexanone, and 16 g of trifurylimidazoline are put into a reactor similar to that described in Example 1. The ratio of the components in weight parts is 100:33:8, respectively. The process is run at 190° C. for 1 hour. The obtained product (yield 90%) is poured out from the reactor, cooled to a temperature 20° C., and ground to a powder state.

EXAMPLE 19

200 g of polycondensation resin with the number of epoxy groups 14-16% by weight, 200 g of 1,9-di-(α-furyl)-nonanetetraene-1,3,6,8-one-5, and 200 g of trifurylimidazoline are put into a reactor similar to that described in Example 1. The ratio of the components in weight parts is 100:100:100, respectively. The process is run at 170° C. for 1.5 hours. The obtained product (yield 90%) is poured out from the reactor, cooled to 25° C., and ground to a powder state.

EXAMPLE 20

200 g of polycondensation resin with the number of epoxy groups 16-18% by weight, 66 g of difurfurylidenecyclohexanone, 10 g of trifurfurylborate, and 100 g of trifurylimidazoline are put into a reactor similar to that described in Example 1. The ratio of the components in weight parts is 100:33:5:50, respectively. The process is run at 160° C. for 1.5 hours. The obtained product (yield 92%) is poured out from the reactor, cooled to 30° C., and ground to a powder state.

EXAMPLE 21

200 g of polycondensation resin with the number of epoxy groups 20-22% by weight, 100 g of a mixture of monofurfurylideneacetone with difurfurylidenacetone at a ratio in weight parts of 1.4:1, 2 g of trifurfurylborate, and 40 g of trifurylimidazoline are put into a reactor similar to that described in Example 1. The ratio of said components in weight parts is 100:50:1:20, respectively. The process is run at 150° C. for 3 hours. The obtained product (yield 91%) is poured out from the reactor, cooled to 20° C., and ground to a powder state.

EXAMPLE 22

100 g of polycondensation resin with the number of epoxy groups 14-16% by weight, 200 g of difurfurylidenecyclohexanone, 7 g of trifurfurylborate, and 100 g of hexamethylenediamine are put into a reactor similar to that described in Example 1. The ratio of the components in weight parts is 100:200:7:100, respectively. The process is run at 160° C. for 2 hours. The obtained product (yield 88%) is poured out from the reactor, cooled to 25° C., and ground to a powder state.

EXAMPLE 23

200 g of polycondensation resin with the number of epoxy groups 20-22% by weight, 100 g of difurfurylideneacetone, 24 g of trifurfurylborate, and 100 g of hexamethylenediamine are put into a reactor similar to that described in Example 1. The ratio of the components in weight parts is 100:50:12:50, respectively. The process is run at 140° C. for 3 hours. The obtained product (yield 92%) is poured out from the reactor, cooled to 20° C., and ground to a powder state.

EXAMPLE 24

200 g of polycondensation resin with the number of epoxy groups 22-24% by weight, 66 g of a mixture of monofurfurylideneacetone with difurfurylideneacetone at a weight ratio of 1:1, and 16 g of hexamethylenediamine are put into a reactor similar to that described in Example 1. The ratio of the components in weight parts is 100:33:8, respectively. The process is run at 200° C. for 2.5 hours. The obtained product (yield 88%) is poured out from the reactor, cooled to 15° C. and ground to a powder state.

EXAMPLE 25

100 g of polycondensation resin with the number of epoxy groups 14–16% by weight, 200 g of difurfurylideneacetone, 12 g of trifurfurylborate, and 100 g of polyethylenepolyamine with molecular weight of 1000 are put into a reactor similar to that described in Example 1. The ratio of said components in weight parts is 100:200:12:100, respectively. The process is run at 130° C. for 2 hours. The obtained product (yield 95%) is poured out from the reactor, cooled to 30° C. and ground to a powder state.

EXAMPLE 26

100 g of polycondensation resin with the number of epoxy groups 16–18%, by weight, 100 g of difurfurylidenecyclohexanone, 5 g of trifurfurylborate, and 50 g of polyethylenepolyamine with molecular weight of 1000 are put into a reactor similar to that described in Example 1. The ratio of the components in weight parts is 100:100:5:50, respectively. The process is run at 150° C. for 2 hours. The obtained product is poured out from the reactor, cooled to 25° C. and ground to a powder state.

EXAMPLE 27

200 g of polycondensation resin with the number of epoxy groups 22–24% by weight, 66 g of a mixture of monofurfurylideneacetone with difurfurylideneacetone at a ratio in weight parts of 1.2:1, and 16 g of polyethylenepolyamine with molecular weight of 1000 are put into a reactor similar to that described in Example 1. The ratio of the components in weight parts is 100:33:8, respectively. The process is run at 160° C. for 2.5 hours. The obtained product (yield 90%) is poured out from the reactor, cooled to 20° C., and ground to a powder state.

EXAMPLE 28

100 g of polycondensation resin with the number of epoxy groups 14–16% by weight, 100 g of difurfurylidenecyclohexanone, 12 g of trifurfurylborate, and 100 g of low molecular polyamide with molecular weight of 2000, which is a product of polycondensation of dimerized linseed oil and polyethylenepolyamine with molecular weight of 1000, are put into a reactor similar to that described in Example 1. The ratio of said components in weight parts is 100:100:12:100, respectively. The process is run at 130° C. for 3 hours. The obtained product (yield 94%) is poured out from the reactor, cooled to 15° C., and ground to a powder state.

EXAMPLE 29

200 g of polycondensation resin with the number of epoxy groups 16–18% by weight, 100 g of difurfurylidenecyclohexanone, 10 g of trifurfurylborate, and 100 g of low molecular polyamide with molecular weight of 3500, which is a product of polycondensation of dimerized oleic acid and polyethylenepolyamine with molecular weight of 1000 are put into a reactor similar to that described in Example 1. The ratio of the components is 100:50:5:50, respectively. The process is run at 160° C. for 2 hours. The obtained product (yield 92%) is poured out from the reactor, cooled to 20° C. and ground to a powder state.

EXAMPLE 30

200 g of polycondensation resin with the number of epoxy groups 18–20% by weight, 66 g of a mixture of monofurfurylideneacetone with difurfurylideneacetone at a ratio in weight parts of 1.4:1,2 g of trifurfurylborate, and 16 g of low molecular polyamide with molecular weight of 10000, which is a product of polycondensation of dimerized linoleic acid and polyethylenepolyamine with molecular weight of 1000 are put into a reactor similar to that described in Example 1. The ratio of the components is 100:33:1:8, respectively. The process is run at 200° C. for 1.5 hours. The obtained product (yield 88%) is poured out from the reactor, cooled to 30° C. and ground to a powder state.

EXAMPLE 31

200 g of polycondensation resin with number of epoxy groups 20–22% by weight, 140 g of difurfurylideneacetone, and 140 g of low molecular polyamide with molecular weight of 2700, which is a product of polycondensation of dimerized linoleic acid and polyethylenepolyamine with molecular weight of 1000 are put into a reactor similar to that described in Example 1. The ratio of said components is 100:70:70, respectively. The process is run at 170° C. for 2.5 hours. The obtained product (yield 90%) is poured out from the reactor, cooled to 15° C. and ground to a powder state.

EXAMPLE 32

200 g of polycondensation resin with the number of epoxy groups 22–24% by weight, 200 g of difurfurylidenecyclohexanone, 24 g of trifurfurylborate, and 200 g of triethanolamine are put into a reactor similar to that described in Example 1. The ratio of the components in weight parts is 100:100:12:100, respectively. The process is run at 160° C. for 2 hours. The obtained product (yield 90%) is poured out from the reactor, cooled to 20° C., and ground to a powder state.

EXAMPLE 33

200 g of polycondensation resin with the number of epoxy groups 20–22% by weight, 66 g of a mixture of monofurfurylideneacetone with difurfurylideneacetone at a ratio in weight parts of 1.2:1, 10 g of trifurfurylborate, and 16 g of triethanolamine are put into a reactor similar to that described in Example 1. The ratio of the components in weight parts is 100:33:5:8, respectively. The process is run at 200° C. for 2.5 hours. The obtained product (yield 88%) is poured out from the reactor, cooled to 30° C. and ground to a powder state.

EXAMPLE 34

100 g of polycondensation resin with the number of epoxy groups 14–16% by weight, 200 g of difurfurylideneacetone, and 50 g of triethanolamine are put into a reactor similar to that described in Example 1. The ratio of the components is 100:200:50, respectively. The process is run at 180° C. for 1.5 hours. The obtained product (yield 90%) is poured out from the reactor, cooled to 15° C., and ground to a powder state.

EXAMPLE 35

200 g of polycondensation resin with the number of epoxy groups 16–18% by weight, 66 g of 1,9-di(α- furyl)-nonanetetraene-1,3,6,8-one-5, 24 g of trifurfurylborate and 16 g of triethanolamine are put into a reactor similar to that described in Example 1. The ratio of the components in weight parts is 100:33:12:8, respectively. The process is run at 150° C. for 2 hours. The obtained product (yield 92%) is poured out from the reactor, cooled to 20° C., and ground to a powder state.

EXAMPLE 36

200 g of polycondensation resin with the number of epoxy groups 18–20% by weight, 200 g of 1,9-di-(α-furyl)-nonanetetraene-1,3,6,8-one-5, 20 g of trifurfurylborate, and 100 g of hexamethylenediamine are put into a reactor similar to that described in Example 1. The ratio of said components in weight parts is 100:100:10:50, respectively. The process is run at 160° C. for 1 hour. The obtained product (yield 94%) is poured out from the reactor, cooled to 25° C., and ground to a powder state.

EXAMPLE 37

100 g of polycondensation resin with the number of epoxy groups 20–22% by weight, 100 g of 1,9-di(α-furyl)-nonanetetraene-1,3,6,8-one-5, and 100 g of polyethylenepolyamine with molecular weight of 1000 are put into a reactor similar to that described in Example 1. The ratio of the components in weight parts is 100:100:100, respectively. The process is run at 130° C. for 1.5 hours. The obtained product (yield 95%) is poured out from the reactor, cooled to 20° C., and ground to a powder state.

EXAMPLE 38

200 g of polycondensation resin with the number of epoxy groups 22–24% by weight, 100 g of 1,9-di-(α-furyl)-nonanetetraene-1,3,6,8-one-5, 10 g of trifurfurylborate, and 100 g of low molecular polyamide with molecular weight of 2000 which is a product of polycondensation of dimerized linseed oil and polyethylenepolyamine with molecular weight of 1000 are put into a reactor similar to that described in Example 1. The ratio of said components is 100:50:5:50, respectively. The process is run at 140° C. for 2 hours. The obtained product (yield 95%) is poured out from the reactor, cooled to 30° C., and ground to a powder state.

EXAMPLE 39

100 g of polycondensation resin with the number of epoxy groups 14–16% by weight, 200 g of 1,9-di-(α-furyl)-nonanetetraene-1,3,6,8-one-5, and 100 g of low molecular polyamide with molecular weight of 3500 which is a product of polycondensation of dimerized oleic acid and polyethylenepolyamine with molecular weight of 1000 are put into a reactor similar to that described in Example 1. The ratio of the components is 100:200:100, respectively. The process is run at 160° C. for 2.5 hours. The obtained product (yield 93%) is poured out from the reactor, cooled to 15° C., and ground to a powder state.

EXAMPLE 40

200 g of polycondensation resin with the number of epoxy groups 16–18% by weight, 66 g of 1,5-di-(α-furyl)-2,4-dimethylpentadiene-1,4-one-3, 24 g of trifurfurylborate, and 16 g of hexamethylenediamine are put into a reactor similar to that described in Example 1. The ratio of the components in weight parts is 100:33:12:8, respectively. The process is run at 200° C. for 1.5 hours. The obtained product (yield 88%) is poured out from the reactor, cooled to 20° C., and ground to a powder state.

EXAMPLE 41

100 g of polycondensation resin with the number of epoxy groups 18–20% by weight, 100 g of 1,5-di-(α-furyl)-2,4-dimethylpentadiene-1,4-one-3,5 g of trifurfurylborate, and 100 g of triethanolamine are put into a reactor similar to that described in Example 1. The ratio of the components in weight parts is 100:100:5:100, respectively. The process is run at 150° C. for 1.5 hours. The obtained product (yield 90%) is poured out from the reactor, cooled to 25° C., and ground to a powder state.

EXAMPLE 42

100 g of polycondensation resin with the number of epoxy groups 20–22% by weight, 200 g of 1,5-di-(α-furyl)-2,4-dimethylpentadiene-1,4-one-3, and 100 g of 3-methyl-5-furylpyrazoline are put into a reactor similar to that described in Example 1. The ratio of the components in weight parts is 100:200:100, respectively. The process is run at 160° C. for 2 hours. The obtained product (yield 94%) is poured out from the reactor, cooled to 30° C., and ground to a powder state.

EXAMPLE 43

200 g of polycondensation resin with the number of epoxy groups 22–24% by weight, 66 g of 1,5-di-(α-furyl)-2,4-dimethylpentadiene-1,4-one-3, 2 g of trifurfurylborate, and 16 g of polyethylenepolyamine with molecular weight of 1000 are put into a reactor similar to that described in Example 1. The ratio of the components is 100:33:1:8, respectively. The process is run at 170° C. for 1.5 hours. The obtained product (yield 90%) is poured out from the reactor, cooled to 15° C., and ground to a powder state.

EXAMPLE 44

100 g of polycondensation resin with the number of epoxy groups 14–16% by weight, 100 g of 1,5-di-(α-furyl)-2,4-dimethylpentadiene-1,4-one-3, and 100 g of 3-methyl-5-furylpyrazoline are put into a reactor similar to that described in Example 1. The ratio of the components in weight parts is 100:100:100, respectively. The process is run at 130° C. for 3 hours. The obtained product (yield 95%) is poured out from the reactor, cooled to 20° C., and ground to a powder state.

EXAMPLE 45

100 g of polycondensation resin with the number of epoxy groups 16–18% by weight, 200 g of 1,5-di-(α-furyl)-2,4-dimethylpentadiene-1,4-one-3, 7 g of trifurfurylborate, and 100 g of low molecular polyamide with molecular weight of 2000, which is a product of polycondensation of dimerized linseed oil and polyethylenepolyamine with molecular weight of 1000 are put into a reactor similar to that described in Example 1. The ratio of the components is 100:200:7:100, respectively. The process is run at 150° C. for 2 hours. The obtained product (yield 93%) is poured out from the reactor, cooled to 25° C., and ground to a powder state.

EXAMPLE 46

100 g of polycondensation resin with the number of epoxy groups 18–20% by weight, 100 g of difurfurylideneacetone, and 50 g of triethanolamine are put into a reactor similar to that described in Example 1. The ratio of the components in weight parts is 100:100:50, respectively. The process is run at 180° C. for 2.5 hours. The obtained product (yield 88%) is poured out from the reactor, cooled to 20° C., and ground to a powder state.

EXAMPLE 47

200 g of polycondensation resin with the number of epoxy groups 20–22% by weight, 66 g of monofurfurylideneacetone, 24 g of trifurfurylborate, and 16 g of trifurylimidazoline are put into a reactor similar to that described in Example 1. The ratio of the components in weight parts is 100:33:12:8, respectively. The process is run at 170° C. for 2 hours. The obtained product (yield 88%) is poured out from the reactor, cooled to 15° C., and ground to a powder state.

EXAMPLE 48

100 g of polycondensation resin with the number of epoxy groups 22–24% by weight, 100 g of monofurfurylideneacetone, 5 g of trifurfurylborate, and 100 g of hexamethylenediamine are put into a reactor similar to that described in Example 1. The ratio of the components in weight parts is 100:100:5:100, respectively. The process is run at 150° C. for 1.5 hours. The obtained product (yield 90%) is poured out from the reactor, cooled to 20° C., and ground to a powder state.

EXAMPLE 49

100 g of polycondensation resin with the number of epoxy groups 14–16% by weight, 200 g of monofurfurylideneacetone, 1 g of trifurfurylborate, and 50 g of polyethylenepolyamine with molecular weight of 1000 are put into a reactor similar to that described in Example 1. The ratio of said components in weight parts is 100:200:1:50, respectively. The process is run at 160° C. for 1 hour. The obtained product (yield 88%) is poured out from the reactor, cooled to 30° C., and ground to a powder state.

EXAMPLE 50

200 g of polycondensation resin with the number of epoxy groups 16–18% by weight, 100 g of monofurfurylidenacetone, and 200 g of low molecular polyamide with molecular weight of 3500, which is a product of polycondensation of dimerized oleic acid and polyethylenepolyamine with molecular weight of 1000 are put into a reactor similar to that described in Example 1. The ratio of the components is 100:50:100, respectively. The process is run at 170° C. for 2 hours. The obtained product (yield 90%) is poured out from the reactor, cooled to 15° C. and ground to a powder state.

EXAMPLE 51

200 g of polycondensation resin with the number of epoxy groups 18–20% by weight, 66 g of monofurfurylideneacetone, 20 g of trifurfurylborate, and 100 g of low molecular polyamide with molecular weight of 2000, which is a product of polycondensation of dimerized linseed oil and polyethylenepolyamine with molecular weight of 1000 are put into a reactor similar to that described in Example 1. The ratio of the components in weight parts is 100:33:10:50, respectively. The process is run at 140° C. for 3 hours. The obtained product (yield 93%) is poured out from the reactor, cooled to 25° C., and ground to a powder state.

EXAMPLE 52

100 g of polycondensation resin with the number of epoxy groups 20–22% by weight, 200 g of monofurfurylideneacetone, 12 g of trifurfurylborate, and 100 g of triethanolamine are put into a reactor similar to that described in Example 1. The ratio of the components in weight parts is 100:200:12:100, respectively. The process is run at 130° C. for 3 hours. The obtained product (yield 92%) is poured out from the reactor, cooled to 15° C., and ground to a powder state.

EXAMPLE 53

100 g of polycondensation resin with the number of epoxy groups 22–24% by weight, 200 g of monofurfurylideneacetone, and 8 g of low molecular polyamide with molecular weight of 10000, which is a product of polycondensation of dimerized linoleic acid and polyethylenepolyamine with molecular weight of 1000 are put into a reactor similar to that described in Example 1. The ratio of the components in weight parts is 100:200:8, respectively. The process is run at 200° C. for 1.5 hours. The obtained product (yield 88%) is poured out from the reactor, cooled to 30° C., and ground to a powder state.

EXAMPLE 54

200 g of polycondensation resin with the number of epoxy groups 14–16% by weight, 66 g of difurfurylidenecyclohexanone, 14 g of trifurfurylborate, and 16 g of triethanolamine are put into a reactor similar to that described in Example 1. The ratio of the components in weight parts is 100:33:7:8, respectively. The process is run at 180° C. for 2.5 hours. The obtained product (yield 90%) is poured out from the reactor, cooled to 20° C., and ground to a powder state.

Table 1 illustrates the properties of the furan-epoxy powder-like binder obtained by the proposed method according to Examples 1–54 and by the known method.

TABLE 1

| Furan-epoxy powder-like binder obtained by the proposed method | Properties | | | | | | |
|---|---|---|---|---|---|---|---|
| | Appearance | Melting point, °C. | $U_{below}$ drop point, °C. | Solubility in acetone | Stability upon storage, months | Non-caking days | Content of epoxy groups, % by weight |
| 1 | 2 | 3 | 4 | 5 | 6 | 7 | 8 |
| By folloiwng | | | | | | | |
| Example 1 | Powder coloured | 86 | 117 | Complete | 9 | 40 | 3.8 |
| Example 2 | from yellow | 84 | 112 | " | 9 | 40 | 4.2 |
| Example 3 | to brown | 88 | 118 | " | 9 | 40 | 3.1 |
| Example 4 | | 88 | 121 | " | 10 | 45 | 2.9 |
| Example 5 | | 92 | 125 | " | 12 | 60 | 1.8 |
| Example 6 | | 83 | 110 | " | 9 | 45 | 3.7 |
| Example 7 | | 86 | 117 | " | 10 | 45 | 2.1 |

TABLE 1-continued

| Furan-epoxy powder-like binder obtained by the proposed method 1 | Appearance 2 | Melting point, °C. 3 | $U_{below}$ drop point, °C. 4 | Solubility in acetone 5 | Stability upon storage, months 6 | Non-caking days 7 | Content of epoxy groups, % by weight 8 |
|---|---|---|---|---|---|---|---|
| Example 8 | | 82 | 109 | " | 9 | 40 | 2.7 |
| Example 9 | | 80 | 101 | " | 9 | 40 | 4.5 |
| Example 10 | | 98 | 130 | " | 12 | 60 | 3.6 |
| Example 11 | | 103 | 135 | " | 12 | 60 | 1.8 |
| Example 12 | | 92 | 121 | " | 12 | 60 | 2.9 |
| Example 13 | | 86 | 114 | " | 10 | 50 | 2.6 |
| Example 14 | | 85 | 112 | " | 10 | 45 | 2.7 |
| Example 15 | | 101 | 132 | " | 12 | 60 | 1.9 |
| Example 16 | | 87 | 115 | " | 10 | 40 | 2.1 |
| Example 17 | | 105 | 137 | " | 12 | 60 | 1.6 |
| Example 18 | | 103 | 129 | " | 12 | 60 | 3.9 |
| Example 19 | | 98 | 127 | " | 12 | 60 | 2.3 |
| Example 20 | | 95 | 123 | " | 12 | 60 | 3.7 |
| Example 21 | | 89 | 118 | " | 12 | 60 | 4.3 |
| Example 22 | | 98 | 125 | " | 12 | 60 | 1.9 |
| Example 23 | | 87 | 118 | " | 10 | 45 | 4.5 |
| Example 24 | | 96 | 120 | " | 10 | 45 | 3.9 |
| Example 25 | | 91 | 116 | " | 9 | 40 | 4.7 |
| Example 26 | | 92 | 119 | " | 7 | 35 | 3.7 |
| Example 27 | | 98 | 124 | " | 12 | 60 | 2.8 |
| Example 28 | | 82 | 103 | " | 7 | 35 | 4.4 |
| Example 29 | | 88 | 111 | " | 10 | 40 | 2.1 |
| Example 30 | | 105 | 130 | " | 12 | 60 | 2.2 |
| Example 31 | | 102 | 125 | " | 12 | 60 | 2.8 |
| Example 32 | | 98 | 121 | " | 12 | 60 | 2.4 |
| Example 33 | | 105 | 135 | " | 12 | 60 | 4.1 |
| Example 34 | | 103 | 131 | " | 12 | 60 | 1.9 |
| Example 35 | | 97 | 121 | " | 10 | 45 | 3.9 |
| Example 36 | | 99 | 132 | " | 12 | 60 | 2.1 |
| Example 37 | | 85 | 114 | " | 9 | 50 | 2.0 |
| Example 38 | | 82 | 109 | " | 7 | 35 | 4.2 |
| Example 39 | | 91 | 123 | " | 10 | 50 | 1.8 |
| Example 40 | | 101 | 128 | " | 12 | 60 | 3.7 |
| Example 41 | | 95 | 118 | " | 10 | 45 | 1.9 |
| Example 42 | | 97 | 121 | " | 12 | 60 | 1.8 |
| Example 43 | | 101 | 133 | " | 12 | 60 | 2.8 |
| Example 44 | | 82 | 108 | " | 10 | 50 | 1.7 |
| Example 45 | | 85 | 112 | " | 10 | 50 | 1.9 |
| Example 46 | | 103 | 135 | " | 12 | 60 | 1.6 |
| Example 47 | | 101 | 132 | " | 12 | 60 | 2.5 |
| Example 48 | | 91 | 119 | " | 10 | 50 | 2.1 |
| Example 49 | | 95 | 126 | " | 12 | 60 | 1.8 |
| Example 50 | | 98 | 133 | " | 12 | 60 | 2.4 |
| Example 51 | | 84 | 112 | " | 10 | 50 | 4.5 |
| Example 52 | | 80 | 106 | " | 7 | 35 | 2.1 |
| Example 53 | | 105 | 132 | " | 12 | 60 | 4.3 |
| Example 54 | | 103 | 135 | " | 12 | 60 | 3.2 |
| Binder obtained by known method | Dark-brown | 92 | 114 | " | 3 | 30 | — |

Table 2 illustrates the properties of the polymer based on the furan-epoxy powder-like binder obtained by the proposed method. The polymer is obtained by hardening the binder by step heat treatment within the temperature range of from 120° to 200° C. with a 6-hr exposure and 20° C. increments.

TABLE 2

| Properties 1 | Value 2 |
|---|---|
| Heat distortion temperature, according to Vicat method, °C. | 212–250 |
| Compression strength, kgf/cm$^2$ | 800–1500 |
| Static bending strength, kgf/cm$^2$ | 300–800 |
| Impact strength, kgf.cm/cm$^2$ | 2–10 |
| Brinnel hardness, kgf/cm$^2$ | 3000–3800 |
| Coking value, % | 35–60 |
| Power factor at 50 Hz and 20° C. | $22.10^{-3}$–$30.10^{-3}$ |
| Chemical stability towards: | |
| alkali | stable |
| acids | stable |
| Combustibility: | |
| of the polymer based on the binder obtained by following Examples 17–19, 24, 27, 31, 34, 37, 39, 42, 44, 46, 50, 53 | combustible |
| of the polymer based on the binder obtained by following Examples 4, 7, 9, 21, 30, 43, 49 | self-extinction ability |
| of the polymer based on the binder obtained by following Examples 1–3, 5, 6, 8, 10–16, 20, 22, 23, 25, 26, 28, 29, 32, 33, 35, 36, 38, 40, 41, 45, 47, 48, 51, 52, 54 | incombustible |

What is claimed is:

1. A method of producing a furan-epoxy powder-like binder comprising:
   (1) reacting
   (a) the polycondensation product of epichlorohydrin with bis(hydroxyphenyl)propane, with
   (b) a ketone of the furan series selected from the group consisting of monofurfurylideneacetone; difurfurylideneacetone; difurfurylidene cyclohexanone; a mixture of monofurfurylideneacetone and difurfurylideneacetone at a weight ratio of from 1:1 to 1.4:1; 1,9-di-(α-furyl)nonanetetraene-1,3,6,8-one-5 and 1,5-di-(α-furyl)-2,4-dimethylpentadiene-1,4-one-3; and
   (c) a nitrogen-containing compound selected from the group consisting of triethanolamine, 3-methyl-5-furylpyrazoline; trifurylimidazoline, hexamethylenediamine; low molecular weight polyamides having a molecular weight of 2,000–10,000, and polyethylenepolyamine having a molecular weight of 1,000 at a temperature of 130° to 200° C. and the weight ratios of components (a):(b):(c) being 100:33-200:8-100;
   (2) cooling the product of (1) to a temperature of not exceeding 30° C.; and
   (3) grinding the product of (2) to a powder state.

2. The method of claim 1 wherein the reaction is conducted in the presence of trifurfurylborate, the weight ratio of trifurfurylborate to the polycondensation product (a) in step (1) being from 1:100 to 12:100.

3. The method of claim 1 wherein component (a) in step (1) has an epoxy content of from 14 to 24% by weight, and step (2) is conducted at a temperature of 15° to 30° C.

4. The method of claim 2 wherein component (a) in step (1) has an epoxy content of from 14 to 24% by weight, and step (2) is conducted at a temperature of 15° to 30° C.

5. The method of claim 3 wherein in step (1), component (a) is monofurfurylideneacetone and component (b) is 3-methyl-5-furylpyrazoline.

6. The method of claim 3 or 4 wherein in step (1), component (a) is monofurfurylideneacetone and component (b) is trifurylimidazoline.

7. The method of claim 3 wherein in step (1), component (a) is monofurfurylideneacetone and component (b) is hexamethylenediamine.

8. The method of claim 4 wherein in step (1), component (a) is monofurfurylideneacetone and component (b) is a polyamide having a molecular weight of from 2,000–10,000.

9. The method of claim 3 or 4 wherein in step (1), component (a) is monofurfurylideneacetone and component (b) is polyethylenepolyamine having a molecular weight of 1,000.

10. The method of claim 3 wherein component (a) in step (1) is monofurfurylideneacetone and component (b) is triethanolamine.

11. The method of claim 3 or 4 wherein in step (1), component (a) is difurfurylideneacetone and component (b) is 3-methyl-5-furylpyrazoline.

12. The method of claim 4 wherein in step (1), component (a) is difurfurylideneacetone and component (b) is trifurylimidazoline.

13. The method of claim 4 wherein in step (1), component (a) is difurfurylideneacetone and component (b) is hexamethylenediamine.

14. The method of claim 3 wherein in step (1), component (a) is difurfurylideneacetone and component (b) is a polyamide having a molecular weight of from 2,000–10,000.

15. The method of claim 4 wherein in step (1), component (a) is difurfurylideneacetone and component (b) is polyethylenepolyamine having a molecular weight of 1,000.

16. The method of claim 3 wherein in step (1), component (a) is difurfurylideneacetone and component (b) is triethanolamine.

17. The method of claim 4 wherein in step (1), component (a) is a mixture of monofurfurylideneacetone and difurfurylideneacetone, the weight ratio of the former to the latter being from 1:1 to 1.4:1, and component (b) is 3-methyl-5-furylpyrazoline.

18. The method of claim 4 wherein in step (1), component (a) is a mixture of monofurfurylideneacetone and difurfurylideneacetone, the weight ratio of the former to the latter being from 1:1 to 1.4:1 and component (b) is trifurylimidazoline.

19. The method of claim 4 wherein in step (1), component (1) is a mixture of monofurfurylideneacetone and difurfurylideneacetone, the weight ratio of the former to the latter being from 1:1 to 1.4:1 and component (b) is a polyamide having a molecular weight of from 2,000–10,000.

20. The method of claim 3 wherein in step (1), component (a) is a mixture of monofurfurylideneacetone and difurfurylideneacetone, the weight ratio of the former to the latter being 1:1 to 1.4:1 and component (b) is polyethylenepolyamine having a molecular weight of 1,000.

21. The method of claim 4 wherein in step (1), component (a) is 1,9-di-(α-furyl)-nonatetraene-1,3,6,8-one-5 and component (b) is 3-methyl-5-furylpyrazoline.

22. The method of claim 3 or 4 wherein in step (1), component (a) is 1,9-di-(α-furyl)-nonatetraene-1,3,6,8-one-5 and component (b) is trifurylimidazoline.

23. The method of claim 4 wherein in step (1), component (a) is 1,9-di-(α-furyl)-nonatetraene-1,3,6,8-one-5 and component (b) is hexamethylenediamine.

24. The method of claim 3 or 4 wherein in step (1), component (a) is 1,9-di-(α-furyl)-nonatetraene-1,3,6,8-one-5 and component (b) is a polyamide having a molecular weight of 1,000.

25. The method of claim 3 wherein in step (1), component (a) is 1,9-di(α-furyl)-nonatetraene-1,3,6,8-one-5 and component (b) is a polyethylenepolyamine having a molecular weight of from about 1000.

26. The method of claim 4 wherein in step (1), component (a) is 1,9-di-(α-furyl)-nonatetraene-1,3,6,8-one-5 and component (b) is triethanolamine.

27. The method of claim 3 wherein in step (1), component (a) is 1,5-di-(α-furyl)-2,4-dimethylpentadiene-1,4-one-3 and component (b) is 3-methyle-5-furylpyrazoline.

28. The method of claim 4 wherein in step (1), component (a) is 1,5-di-(α-furyl)-2,4-dimethylpentadiene-1,4-one-3 and component (b) is hexamethylenediamine.

29. The method of claim 4 wherein in step (1), component (b) is 1,5-di-(α-furyl)-2,4-dimethylpentadiene-1,4-one-3 and component (c) is trifurylimidazoline.

30. The method of claim 4 wherein in step (1), component (b) is 1,5-di-(α-furyl)-2,4-dimethylpentadiene-1,4-one-3 and component (c) is a polyamide having a molecular weight of from 2,000 to 10,000.

31. The method of claim 4 wherein in step (1), component (b) is 1,5-di(α-furyl)-2,4-dimethylpentadiene- 1,4-one-3 and component (c) is a polyethylenepolyamine having a molecular weight of from about 1000.

32. The method of claim 4 wherein in step (1), component (b) is 1,5-di(α-furyl)-2,4-dimethylpentadiene-1,4-one-3 and component (c) is triethanolamine.

33. The method of claim 3 or 4 wherein in step (1), component (b) is difurfurylidenecyclohexanone and component (c) is trifurylimidazoline.

34. The method of claim 4 wherein in step (1), component (b) is difurfurylidenecyclohexanone and component (c) is hexamethylenediamine.

35. The method of claim 4 wherein in step (1), component (b) is difurfurylidenecyclohexanone and component (c) is a polyamide having a molecular weight of 2,000 to 10,000.

36. The method of claim 4 wherein in step (1), component (b) is difurfurylidenecyclohexanone and component (c) is a polyethylenepolyamine having a molecular weight of 1,000.

37. The method of claim 4 wherein in step (1), component (b) is difurfurylidenecyclohexanone and component (c) is triethanolamine.

* * * * *